(12) United States Patent
Liu et al.

(10) Patent No.: US 10,655,877 B2
(45) Date of Patent: May 19, 2020

(54) EVAPORATOR COIL PROTECTION FOR HVAC SYSTEMS

(71) Applicant: Lennox Industries Inc., Richardson, TX (US)

(72) Inventors: Wenqian Liu, Plano, TX (US); Zer Kai Yap, Allen, TX (US); Marcus Troxell, Frisco, TX (US); William Clay Toombs, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 154 days.

(21) Appl. No.: 15/876,687

(22) Filed: Jan. 22, 2018

(65) Prior Publication Data

US 2019/0226706 A1    Jul. 25, 2019

(51) Int. Cl.
```
F24F 11/43      (2018.01)
F24F 1/0018     (2019.01)
F25D 21/00      (2006.01)
F25B 49/02      (2006.01)
F25B 47/00      (2006.01)
F24F 11/00      (2018.01)
```

(52) U.S. Cl.
CPC ............ *F24F 11/43* (2018.01); *F24F 1/0018* (2013.01); *F25B 47/006* (2013.01); *F25B 49/02* (2013.01); *F25B 49/022* (2013.01); *F25D 21/008* (2013.01); *F24F 2011/0005* (2013.01); *F25B 2600/01* (2013.01); *F25B 2600/0253* (2013.01); *F25B 2600/11* (2013.01); *F25B 2600/111* (2013.01); *F25B 2600/112* (2013.01); *F25B 2700/11* (2013.01); *F25B 2700/21171* (2013.01)

(58) Field of Classification Search
CPC .......... F25B 2600/0253; F25B 2600/11; F25B 2700/11; F25B 49/022
See application file for complete search history.

(56) References Cited

U.S. PATENT DOCUMENTS

| | | | | |
|---|---|---|---|---|
| 5,065,593 A | * | 11/1991 | Dudley | F25D 21/006 62/156 |
| 2007/0251251 A1 | * | 11/2007 | Wojdyla | B60H 1/321 62/180 |
| 2008/0168766 A1 | * | 7/2008 | Oomura | B60H 1/004 60/320 |
| 2010/0170273 A1 | * | 7/2010 | Morimoto | B01D 53/261 62/176.6 |
| 2015/0047816 A1 | * | 2/2015 | Radoane | F28F 13/04 165/135 |
| 2017/0234564 A1 | * | 8/2017 | Goel | F24F 11/77 62/93 |

(Continued)

*Primary Examiner* — Henry T Crenshaw
(74) *Attorney, Agent, or Firm* — Baker Botts L.L.P.

(57) ABSTRACT

According to certain embodiments, a system comprises a controller and an HVAC system with components comprising an evaporator unit comprising an evaporator coil, an indoor fan, and a discharge air duct and a condenser unit comprising a compressor, a condenser coil, and an outdoor fan. The system is configured to determine that a first or a second level of evaporator coil freeze risk is present and to communicate an instruction to the HVAC system with a first or a second action to counteract the freeze risk. For example, in certain embodiments, the actions comprise changing the indoor fan speed, changing the compressor speed, and changing the outdoor fan speed.

20 Claims, 4 Drawing Sheets

(56) References Cited

U.S. PATENT DOCUMENTS

2017/0356668 A1* 12/2017 Goel ................. F25B 49/022
2018/0274833 A1*  9/2018 Trnka ................ F25B 47/02
2019/0092134 A1*  3/2019 Vehr ................. B60H 1/004

* cited by examiner

EVAPORATOR COIL PROTECTION FOR HVAC SYSTEMS

TECHNICAL FIELD

Certain embodiments of the present disclosure relate generally to control of HVAC system operation to prevent negative performance due to freeze conditions.

BACKGROUND

Heating ventilation and air conditioning (HVAC) systems may use an evaporator coil as a heat exchanger to facilitate heat transfer between the system and the space being provided with conditioned air. As a result of loss of refrigerant charge, lower ambient conditions, lower load requirement, or lower air flow from a dirty air filter or degraded indoor blower motor, the surface temperature of the evaporator may fall below the desirable temperature. This may lead to the formation and buildup of ice on the surface of the evaporator coil as water vapor in the air passes over the coil. Consequently, the buildup of ice may further decrease the heat transfer performance of the coil and impede air passing over the evaporator coil. These problems compound each other to lead to further freezing of the evaporator coil, reduced cooling capacity, and reduced compressor reliability.

SUMMARY OF THE DISCLOSURE

According to certain embodiments, a system comprises a controller and a plurality of HVAC components. The HVAC components comprise an evaporator unit and a condenser unit. The evaporator unit comprises an evaporator coil and an indoor fan. The indoor fan is configured to cause movement of air over the evaporator coil and through a discharge air duct positioned downstream of the evaporator coil when the indoor fan is operating. The condenser unit comprises a compressor, a condenser coil, and an outdoor fan. The compressor is configured to drive refrigerant through the HVAC components, and the outdoor fan is configured to cause movement of air over the condenser coil when the outdoor fan is operating.

In some embodiments, the controller is configured to receive first sensor data from one or more sensors. Each sensor is configured to sense a property associated with the HVAC components. The controller is further configured to determine, based on the first sensor data, that the evaporator coil is experiencing a first level of freeze risk. In response to determining that the evaporator coil is experiencing the first level of freeze risk, the controller is configured to send the HVAC components an instruction to perform a first action. The controller is further configured to receive second sensor data from the one or more sensors and determine, based on the second sensor data, that the evaporator coil is experiencing a second level of freeze risk. The second level indicates a greater risk of freezing than the first level. In response to determining that the evaporator coil is experiencing a second level of freeze risk, the controller is configured to send the HVAC components an instruction to perform a second action.

In some embodiments, the first sensor data comprises a first temperature sensed by a discharge air temperature sensor that is configured to sense air temperature in the discharge air duct. The controller is configured to determine that the evaporator coil is experiencing the first level of freeze risk when the first temperature is below a first threshold.

In some embodiments, the second sensor data comprises a second temperature sensed by the discharge air temperature sensor. The controller is configured to determine that the evaporator coil is experiencing the second level of freeze risk when the second temperature is below a second threshold the second threshold is less than the first threshold.

In some embodiments, the first action comprises increasing the speed of the indoor fan. In some embodiments, the second action comprises reducing the speed of the compressor and reducing the speed of the outdoor fan.

In some embodiments, the controller is further configured to determine, on a periodic basis, whether the compressor has been operating at the reduced speed for a first pre-determined amount of time. In response to determining that the compressor has been operating at the reduced speed for the first pre-determined amount of time, the controller is configured to send the HVAC components an instruction to increase the compressor speed for a second pre-determined amount of time. In response to determining that the second pre-determined amount of time has elapsed, the controller is configured to send the HVAC components an instruction to resume operating the compressor at the reduced speed.

In some embodiments, the first action comprises increasing the speed of the indoor fan to a maximum speed and the second action comprises decreasing the speed of the indoor fan.

In some embodiments, the second action comprises determining whether reducing the compressor speed to a setting configured to mitigate the second level of freeze risk would cause the compressor to operate below a minimum compressor speed. In response to determining that reducing the compressor speed would cause the compressor to operate below the minimum compressor speed, the second action further comprises initiating a procedure to shut off the compressor and the outdoor fan.

In some embodiments, the controller is further configured to receive third sensor data from the one or more sensors and determine, based on the third sensor data, that the evaporator coil has recovered from the first level of freeze risk and the second level of freeze risk. In response to the determination that the evaporator coil has recovered from the first level of freeze risk and the second level of freeze risk, the controller is configured to send the HVAC components one or more instructions that cause the HVAC components to resume normal operation.

In some embodiments, the first sensor data and the second sensor data comprise pressure data received from a pressure transducer. In some embodiments, the one or more sensors sense properties other than a coil temperature of the evaporator coil.

According to certain embodiments, an HVAC system may have an evaporator unit and a condenser unit. The condenser unit may have a compressor, a condenser, and a condenser fan. The evaporator unit may have an evaporator coil, a blower fan, a discharge air duct, and at least one sensor. As an example, according to certain embodiments, the sensor may be a discharge air temperature sensor or an airflow meter located in the discharge air duct. As another example, according to certain embodiments, the sensor may be a pressure transducer. The components of the evaporator unit may be coupled to the components of the condenser unit via refrigerant lines. The HVAC system (including any suitable component(s) thereof) may be communicatively coupled to a controller. The controller may control the operation of the HVAC system components.

The sensor may be positioned in such a way as to enable the controller to determine surface temperature characteristics of the evaporator coil based on sensor data received from the sensor (e.g., without requiring any freeze stat or similar temperature sensor to directly measure the surface of the evaporator coil). Additionally, unlike a freeze stat sensor that only measures a discrete portion of an evaporator coil, the sensor disclosed herein may be positioned such that the controller may accurately approximate the characteristics of the entire evaporator coil based on sensor data received from the sensor. In certain embodiments, multiple sensors of various types may be employed to measure sensor data from which the controller determines the surface temperature characteristics of the evaporator coil.

According to certain embodiments, the sensor will communicate data from the sensor to the controller. In certain applications, the controller will determine, based on the sensor data, that the performance of the evaporator coil has degraded. The detected performance degradation may indicate to the controller that the evaporator coil is experiencing or is about to experience a freeze risk. The controller may detect multiple levels of freeze risk, with successive levels of freeze risk indicating a heightened level of the evaporator coil freezing over. For example, in certain embodiments, the controller may be configured to detect, based on the sensor data, a first freeze risk and a second more severe freeze risk.

According to certain embodiments, the controller may be configured to control the operation of the various components of the HVAC system. Based on detecting a certain level of freeze risk, the controller may change the operation of certain selected components from their ordinary or their presently selected operation. For example, when the controller determines that the evaporator coil is experiencing a freeze risk the controller may increase the speed of the blower fan, causing a greater amount of air to pass over the evaporator coil with the desired effect of reducing the risk of the evaporator coil freezing. In certain other embodiments, when the controller determines that the evaporator coil is experiencing a freeze risk the controller may decrease both the compressor speed and the condenser fan speed, causing refrigerant with a relatively higher evaporating temperature to flow through the evaporator coil with the desired effect of reducing the risk of the evaporator coil freezing.

In certain embodiments, the controller may respond to a determination that there is a freeze risk by both increasing the blower speed and decreasing both the compressor speed and condenser fan speed, in some embodiments, the controller may, in response to determining that the evaporator coil is experiencing a first level of freeze risk, increase the speed of the blower fan, and in response to determining that the evaporator coil is experiencing a second level of freeze risk, decrease both the compressor speed and the condenser fan speed. In some embodiments, the controller may determine that the second level of freeze risk has occurred by receiving data from the sensor that indicates the second level of freeze risk. For example, the second level of freeze risk may be indicated by determining that the conditions of the evaporator coil have continued to decline or that, for a predetermined amount of time, the conditions of the evaporator coil have held steady or have not improved significantly.

In certain embodiments, the controller may, after reducing the compressor speed in response to determining that the evaporator coil was experiencing a freeze risk, cycle the compressor speed from the reduced speed selected to a greater compressor speed to protect the compressor from damage from operation at a reduced speed for too long. In some embodiments, the controller may determine to shut off the compressor rather than operate the compressor at a reduced speed if the desired reduced speed is less than the acceptable minimum compressor speed for avoiding damage to the compressor.

In certain embodiments, the controller may return the HVAC system to normal operation after determining, based on the received data from the sensor, that the conditions of the evaporator coil no longer pose a risk of freezing over.

Certain embodiments may provide one or more technical advantages. As an example, certain embodiments may better protect against evaporator coil freeze compared to conventional freeze stat protection. Conventional freeze stat protection may only measure a discrete portion of an evaporator coil. As a result, conventional freeze stat protection may fail to detect the overall condition of the evaporator coil or may fail to detect pre-freezing or freezing conditions at certain cold spots on the evaporator coil (e.g., cold spots occurring outside of the discrete portion measured by the freeze stat sensor). Furthermore, certain embodiments may provide an advantage of layered responses to counteracting evaporator coil freezing events when compared to conventional systems that merely cease operation of the compressor. Certain embodiments may allow for determining a condition of an evaporator coil using sensor data from a discharge air temperature sensor, a pressure transducer, or other existing sensor (i.e., a sensor that has an additional/existing purpose in the HVAC system other than just providing sensor data from which the temperature of the evaporator coil is determined). As a result, certain embodiments may omit a freeze stat protection sensor, which may allow for a simpler design and reduced cost. Certain embodiments may include all, some, or none of the above-described advantages. Other advantages will be apparent to those of ordinary skill in the art.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1A:
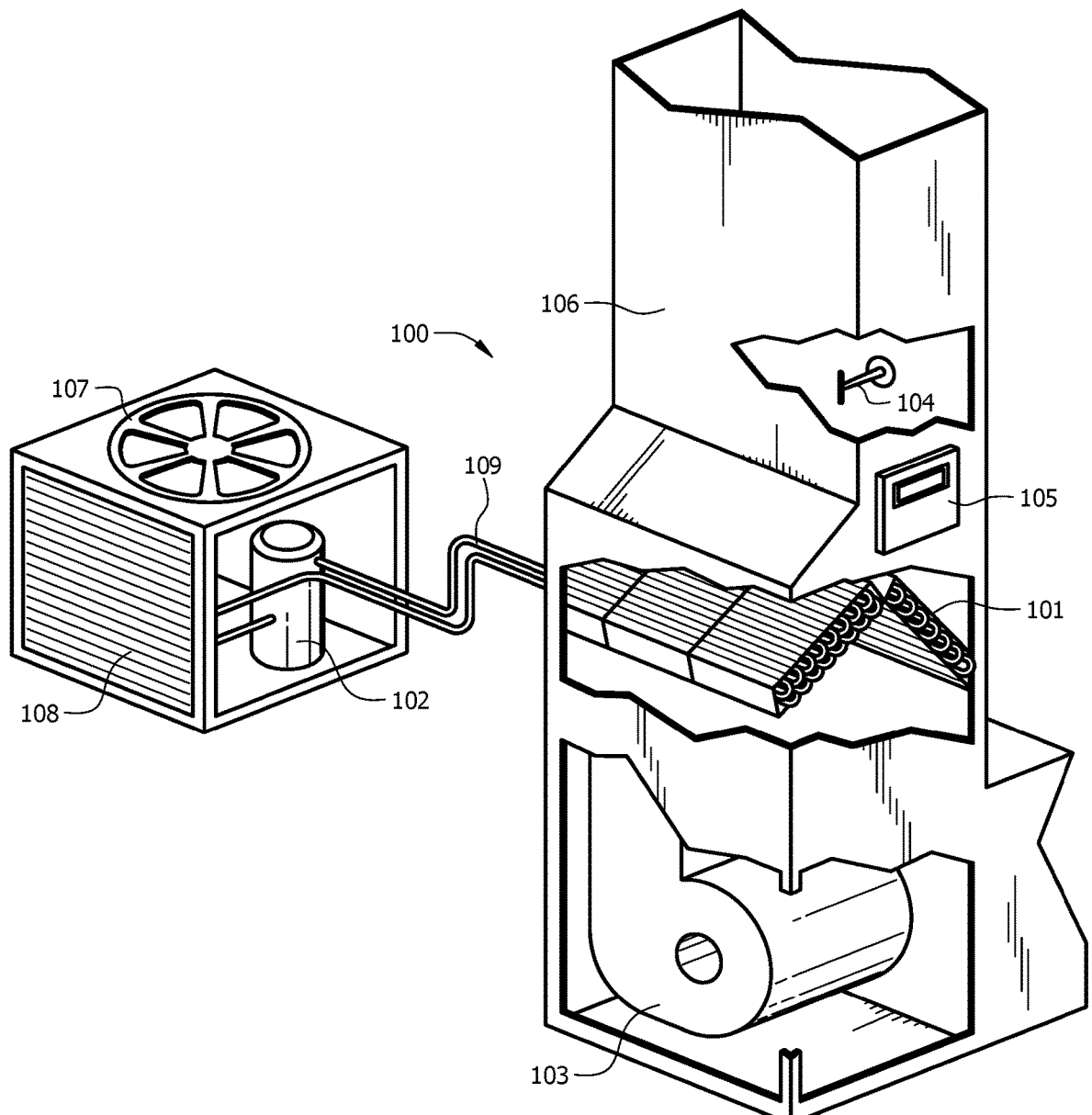
FIG. 1A illustrates an example HVAC system with evaporator coil protection.

Embodiments of the present disclosure and its advantages are best understood by referring to FIGS. 1 through 4 of the drawings, like numerals being used for like and corresponding parts of the various drawings.

Heating ventilation and air conditioning (HVAC) systems, such as heat pump systems, air conditioning systems, combined heating-and-air conditioning systems, and refrigeration systems, each function to condition a space. As an example, an HVAC system configured to perform air conditioning functionality may lower the temperature and remove humidity from the conditioned space. The HVAC system may achieve this desirable effect by employing a refrigeration cycle. By compressing a refrigerant and circulating the compressed refrigerant through the HVAC system, usually first through a condenser, then through an expansion device, and lastly through an evaporator before returning to the compressor, cooling may be achieved within the conditioned space. Air present in an air duct surrounding the cold surface of the evaporator will experience a reduction in temperature resulting from the transfer of thermal energy out of the air and into the refrigerant circulating within the evaporator coil. An indoor fan or a blower fan may drive air over the cold evaporator, carrying now-cooled air away from the evaporator and into the conditioned space.

During operation of an HVAC system the evaporator coil may suffer loss in performance as a result of ice forming on the evaporator itself. Ice my form on the exterior of the evaporator for a variety of conditions. For example, common causes of ice formation include loss of refrigerant charge, low ambient temperatures, dirty evaporator coils, uneven air flow distribution over the evaporator, low load requirement, indoor blower fan degradation, low refrigerant saturate suction temperature, and reduced air flow over the evaporator such as may occur with a dirty or blocked air filter. These issues may cause the surface temperature of the evaporator coil, either across the entire evaporator or localized to particular regions, to fall. If the temperature of the air passing over the evaporator drops below the dew point, any water vapor that may be present in the air will begin to condense onto the evaporator itself. If the HVAC system continues operating with the evaporator coil below the freezing point of the moisture condensing on the coil, this inevitably leads to the formation of ice on the surface of the evaporator.

An evaporator experiencing a freeze risk and ultimately experiencing the formation of ice on the surface of the evaporator coil will have diminished performance. The buildup of ice may increase the heat resistance of the evaporator and slow heat transfer between the refrigerant and the air. Ice buildup may also reduce the rate of air flow that passes over the evaporator's surface, further reducing cooling capacity. The reduced heat transfer between the evaporator and the air may exacerbate the temperature drop of the evaporator coil, leading to further ice buildup and increasingly poor performance of the HVAC system. Not only is the reduced cooling to the conditioned space an inconvenience, it may cause reliability issues and decrease the life of the system itself. For instance, when the evaporator's heat transfer rate is reduced as a result of the formation of ice, this can lead to lower refrigerant suction pressure which may cause reliability issues for the HVAC system's compressor.

Some conventional systems may use a freeze stat installed proximate the evaporator to protect against the HVAC system continually operating once the evaporator has begun to experience ice buildup. This freeze stat may have a first setpoint for a temperature close to the freezing point. When the freeze stat detects that the temperature of the evaporator coil has reached the first setpoint, the HVAC system will switch the compressor off. The compressor will not resume operation until the freeze stat detects that the temperature of the evaporator coil has risen to a second setpoint configured to indicate that there is no remaining ice and no longer a freeze risk.

Certain embodiments of the present disclosure may have advantages over conventional systems using a freeze stat. For example, certain embodiments reduce cost in materials and operational cost because the freeze stat and associated components can be omitted from the HVAC system. Another advantage of certain embodiments is that the HVAC system can detect a freeze risk that occurs anywhere on the evaporator, such as freeze risk that occurs on the evaporator coil as a whole. This is an advantage compared to the conventional freeze stat because the conventional freeze stat may only detect freezing of a discrete portion of the evaporator coil temperature (which might not necessarily be the portion of the evaporator coil that is experiencing the risk of freezing). Additionally, certain embodiments improve user comfort within the conditioned space. For example, rather than employing a freeze stat that causes the compressor to completely turn off when detecting a freeze event, embodiments of the present disclosure may take actions to mitigate a freeze risk in order to reduce the frequency/likelihood of having to turn the compressor completely off. It is understood that certain embodiments may include other advantages and that the advantages described are merely examples. Certain embodiments may include all, some, or none of the above-described advantages. Other advantages will be apparent to those of ordinary skill in the art.

FIG. 1A illustrates an example HVAC system 100 with a plurality of HVAC components. HVAC system 100 may include an evaporator unit and a condenser unit. The condenser unit may include a compressor 102, a condenser 108, and a condenser fan 107 within a condenser housing. The compressor 102 may be a variable speed compressor, a reciprocating compressor, a hermetically sealed compressor, a plurality of compressors operating in parallel, or any other type of compressor commonly used in HVAC systems to compress a medium or refrigerant and circulate the refrigerant throughout the HVAC system 100. Refrigerant tubing 109 may be used to circulate the compressed refrigerant within HVAC system 100. The condenser 108 may be an air-cooled condenser or other type of condenser commonly used in HVAC systems. The condenser 108 may have an outdoor fan 107 to move air over the condenser 108 and increase the rate of heat transfer between ambient air and the working medium within the condenser 108. The outdoor fan 107 may be referred to as a variable speed or multi-speed condenser fan.

In certain embodiments, the evaporator unit of HVAC system 100 may include an indoor fan 103, an evaporator 101, an air duct 106, and a sensor 104. The HVAC system 100 may provide cooled air to conditioned spaces using mechanical or forced ventilation. An indoor fan 103 may be disposed within an air duct 106 to drive the movement of air in the air duct 106. The indoor fan 103 may be referred to as a variable speed or multi-speed air handler or as a variable speed or multi-speed blower.

In certain embodiments, the evaporator 101 may be a heat exchanger of any type commonly used in HVAC systems. The evaporator 101 may be the kind used in closed compressor driven circulation of liquid coolant or refrigerant which has radiator coils. In certain embodiments, the evaporator 101 may be disposed within the air duct 106. The evaporator 101 may be positioned so that the bulk of the air being driven through the air duct 106 by indoor fan 103 passes over evaporator 101 to produce heat transfer from the refrigerant in evaporator 101 to the air passing over the evaporator 101.

In certain embodiments, the one or more sensors 104 may be a temperature sensor or any other type sensor commonly used in HVAC systems. In certain embodiments, the HVAC system 100 may operate with one or more sensors 104 other than a freeze stat sensor that senses the temperature of evaporator coil 101 (e.g., the freeze stat may be optional and may be omitted from certain embodiments).

In some embodiments, the air duct 106 may continue downstream from the evaporator coil 101, this downstream region of the air duct 106 may be referred to as the discharge air duct 106. One or more sensors 104 may be disposed within the air stream in the discharge air duct 106. The one or more sensors 104 may be positioned a distance downstream from the evaporator 101. The number and placement of the one or more sensors 104 may be selected based on a desire to both be close enough to the evaporator to receive accurate and nearly instantaneous information regarding the performance of the evaporator coils 101 and also be further away from the evaporator coils 101 such that the air may sufficiently mix and may be considered nearly uniform so that the one or more sensors 104 may accurately perceive the operating status of the whole evaporator 101.

In some embodiments, at least one of the sensors 104 may be a discharge air temperature (DAT) sensor. The one or more sensors 104 may measure the air temperature of the air within the air duct 106 in order to predict the saturated suction temperature.

In certain embodiments, the one or more sensors 104 may produce sensor data associated with a sensed property of the HVAC components. In some embodiments, the one or more sensors 104 may sense the operating conditions of the evaporator 101. For example, the operating conditions of the evaporator 101 may include the temperature of the refrigerant within the evaporator coil 101, the surface temperature of the evaporator coil 101, the air temperature of the air passing over the evaporator coil 101, the refrigerant pressure within refrigerant tubing 109, etc. The one or more sensors 104 may be communicatively coupled to controller 105 to communicate sensor data to controller 105. The one or more sensors 104 may continuously transmit sensor data to controller 105 or may periodically transmit sensor data to controller 105.

In certain embodiments, the HVAC system 100 may include a controller 105. The controller 105 may be part of the evaporator unit, part of the condenser unit, integrated into one of the other components of HVAC system 100, or may be remote from HVAC system 100. Controller 105 may control the operation and functionality of HVAC system 100 and its associated components. In certain embodiments, controller 105 may be configured to control HVAC system 100 in such a way as to operate HVAC system 100 to protect the evaporator 101 from experiencing performance loss from freeze events. An example of controller 105 will be described in further detail in FIG. 2 below, and examples of operations of performed by controller 105 will be described with respect to FIGS. 3-4 below.

In certain embodiments, the controller 105 may be configured to calibrate the one or more sensors 104. Calibration of sensors 104 may be manually calibrated in controller 105 by pre-programming or may be automatically calibrated by controller 105. In some embodiments, the controller 105 may calibrate the received sensor data based on the distance away from the evaporator 101 that the one or more sensors 104 are installed. In some embodiments, the controller 105 may calibrate the received sensor data based on user input of manually measuring the surface temperature of evaporator 101.

In certain embodiments, the controller 105 may be configured with two predefined temperature setting in a control algorithm for detecting and preventing the evaporator coil 101 from freezing. For example, the one or more sensors 104 in the discharge air duct 106 may continuously monitor the discharge air temperature (DAT) of the air downstream from the evaporator coil. As the HVAC system 100 is operating, the evaporator coils 101 may be cooled by the refrigerant such that the evaporator may cool the air moving through the air duct 106. If the air moving over the evaporator coil 101 is, for a variety of reasons, insufficient to maintain the temperature of the evaporator coil 101 through the transfer of heat from the warm air to the cold evaporator coil 101, then the surface temperature of the evaporator coil 101 will continue to fall. The controller 105 may recognize that the temperature of the evaporator coil 101 has fallen and has reached a temperature which presents a risk of the evaporator coil freezing based on the DAT data received from the one or more sensors 104 in the discharge air duct 106. The controller may command the HVAC system 100 to take a first action when the DAT has fallen below the first predefined temperature. If, after commanding the HVAC system 100 to take the first action, the DAT does not increase to a satisfactory temperature or if the DAT falls below an even colder second predefined temperature, the controller 105 may command the HVAC system 100 to take a second action. Examples of the different actions that the controller 105 may command the HVAC system 100 to employ will be discussed in further detail in the discussion of FIGS. 3-4.

In certain embodiments, the controller 105 may respond to a freeze risk by taking an action to counteract the falling temperature of the evaporator 101 in an effort to prevent the evaporator coil 101 from freezing and losing performance. In certain embodiments, an action that the controller 105 may command the HVAC system 100 to take in an attempt to return the evaporator temperature to normal above-freezing operation includes increasing the speed of the indoor fan 103. For example, during normal operation, the indoor fan 103 may be operating at a certain speed, the speed may have been selected by the control logic or according to a predefined speed, such as a speed selected by controller 105 to drive the temperature of the conditioned space toward a setpoint received from a thermostat. Based on the received DAT data indicating a freeze risk, the controller 105 may increase the speed of the indoor fan 103 from anywhere in the range of the current operating fan speed and the maximum possible fan speed. By increasing the speed of the indoor fan 103 the HVAC system 100 increase the volumetric flow rate of air passing over the evaporator coil 101. In general, as volumetric flow rate increases so too does the rate of heat transfer. By increasing the rate of heat transfer between the evaporator coil 101 and the air, the temperature of the evaporator coil may increase, the DAT may increase, and the freeze risk may be reduced or eliminated.

In certain embodiments, another action that the controller 105 may command the HVAC system 100 to take in an attempt to return the evaporator temperature to a normal above-freezing operation includes reducing the speed of the compressor 102. For example, during normal operation, the compressor 102 supplies compressed refrigerant a certain rate. Based on the received DAT data indicating a freeze risk, the controller 105 may slow the speed of the compressor 102 to anywhere in the range of the current operating compressor speed to completely shutting the compressor off. As the compressor speed is decreased, the mass flow rate of refrigerant delivered to the evaporator is decreased and thus the rate of heat transfer to the evaporator is decreased. The evaporator surface temperature is therefore increased due to the increased evaporating temperature. Based on the DAT temperature, the controller 105 may determine the appropriate reduction in speed for the compressor 102 so that the temperature of the evaporator coil may increase, the DAT may increase, and the freeze risk may be reduced or eliminated. When the speed of the compressor is reduced, the speed of the condenser fan may also be reduced hi order to achieve more efficient operation.

In certain embodiments, the controller 105 may take all, some, or none of the actions just described, and/or other actions. The controller 105 may also elect to choose a mix of actions. For example, based on the mode and desired temperature selected by a user and a particular DAT data received, the controller 105 may determine to increase the speed of the indoor fan 103 from fifty percent to seventy-five percent and decrease the speed of the compressor 102 from one hundred percent to seventy-five percent along with decreasing the speed of the outdoor condenser fan 107 from seventy five percent to fifty percent. In certain embodiments, the appropriate action determined by the controller 105 may be determined based at least in part on factors comprising maintaining the performance of HVAC system 100 at the level selected by a user, minimizing total load of the system to reduce energy consumption and improve efficiency, maintain reliability of HVAC system components, as well as other factors.

Figure 1B:
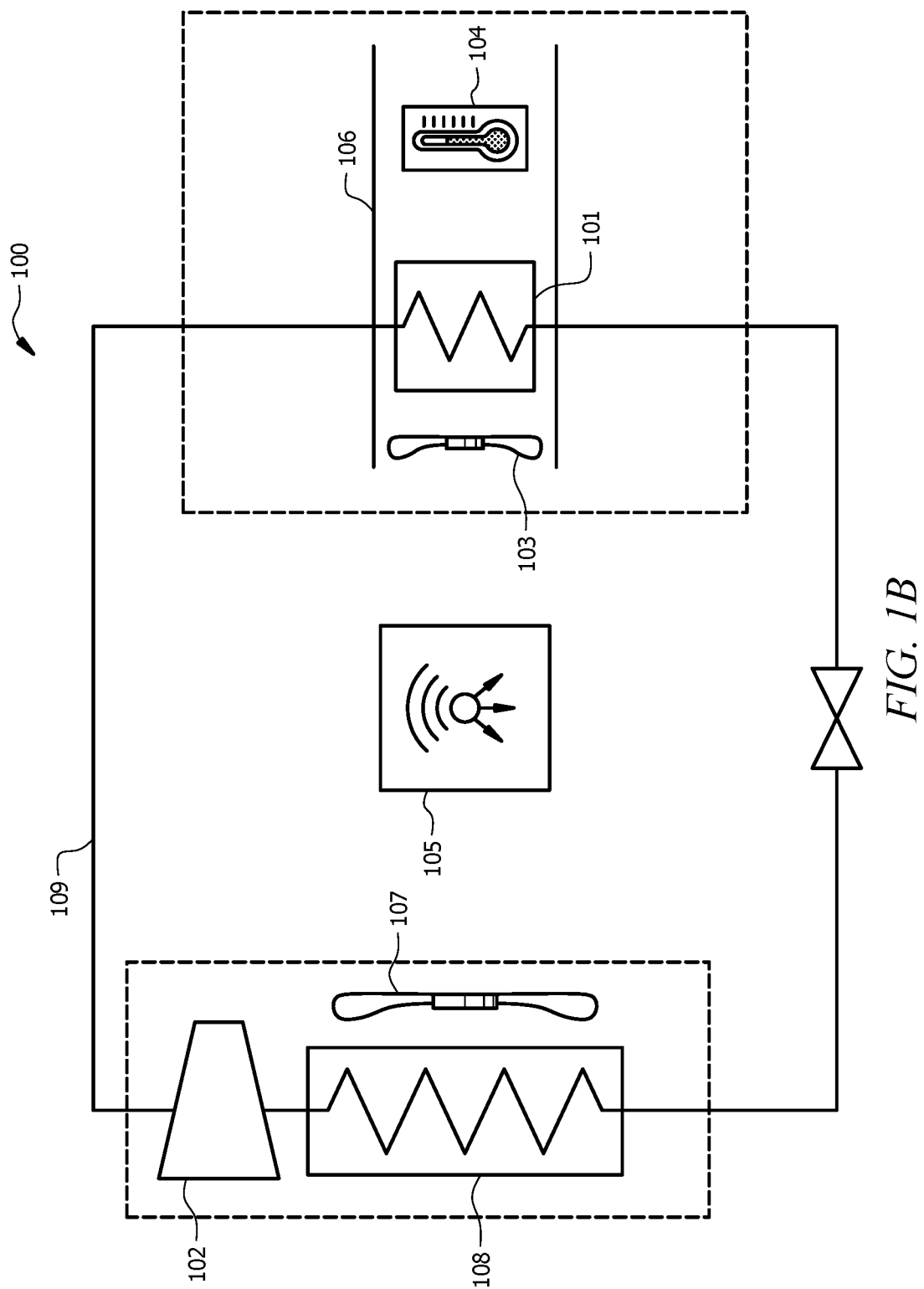
FIG. 1B illustrates an example HVAC system with evaporator coil protection represented as a system block diagram.

FIG. 1B illustrates an example HVAC system with a plurality of HVAC components. FIG. 1B is analogous to FIG. 1A and represents the components of FIG. 1A in system block diagram form. It is understood that FIG. 1A and FIG. 1B are merely intended as example embodiments. The disclosure should be understood as applying to any suitable HVAC system and is not to be interpreted as being limited to only residential or split system HVAC units. In certain embodiments the present disclosure may also be applied in commercial HVAC systems.

Figure 2:
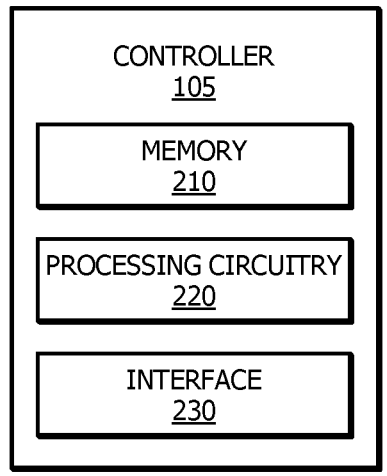
FIG. 2 illustrates an example controller.

Referring now to FIG. 2, HVAC system 100 may include one or more controllers 105 that control operation of the HVAC system 100 and its associated components. In the illustrated embodiment of FIG. 2, controller 105 includes a memory 210, processing circuitry 220, and an interface 230. In an embodiment, controller 105 may comprise, or be coupled to, a computer-readable medium with memory 210 for storing control logic or instructions for operating HVAC system 100 components. Controller memory 210 may be a volatile or non-volatile memory of any known type commonly used in HVAC systems. Controller 105 may store computer executable instructions within memory 210. The computer executable instructions may be included in computer code. Controller 105 may be implemented with hardware, software, firmware, or any combination thereof.

Controller 105 may, additionally, be implemented with processing circuitry 220 for executing stored instructions. Controller 105 may be responsive to or operable to execute instructions stored as part of software, hardware, integrated circuits, firmware, microcode or the like. The functions, acts, methods or tasks performed by controller 105, as described herein, may be performed by processing circuitry 220 executing instructions stored in memory 210. The instructions are for implementing the processes, techniques, methods, or acts described herein. Controller processing circuitry 220 may be any known type of processing circuitry commonly used in HVAC systems. The processing circuitry may be a single device or a combination of devices, such as associated with a network or distributed processing. Controller 105 may operably couple to HVAC system 100 components via wired or wireless connections.

Controller 105 may receive data, which may comprise signals from one or more sensors 104. The data received by controller 105 may be received directly from the one or more sensors 104, or, may be received indirectly through one or more intermediate devices such as a signal converter, processing circuitry, an input/output interface (e.g. interface 230), an amplifier, a conditioning circuit, a connector, and the like. Controller 105 may operate. HVAC system 100 components in response to received data the one or more sensors 104. Additionally, controller 105 may operate HVAC system 100 components in response to user input, demands of the conditioned space, refrigerant and/or ambient air conditions, control logic, and the like.

Figure 3:
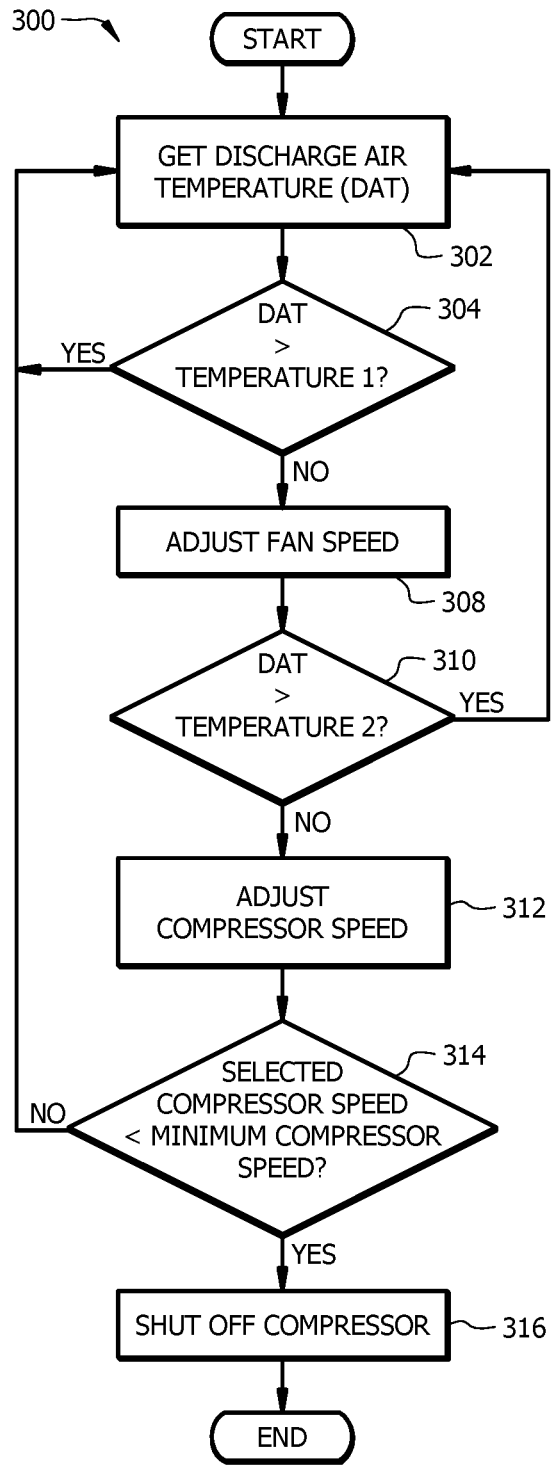
FIG. 3 is a flowchart illustrating a method that may be performed by the HVAC system to reduce freezing of the evaporator coil.

FIG. 3 is a flowchart illustrating an example of operating example HVAC systems with evaporator coil protection. It is understood that embodiments shown are simply used as examples and the invention is not restricted to these embodiments alone. In particular embodiments, controller 105 will carry out operation 300 and command the HVAC system 100 to take certain actions. In particular embodiments, the operation will be initiated in step 302 where the controller 105 will receive first sensor data from the one or more sensors 104. As an example, in certain embodiments the sensor data received by the controller 105 in step 302 may be the DAT of the air in the discharge air duct 106 sensed by the one or more sensors 104.

In particular embodiments, in step 304 the controller 105 may determine if the evaporator coil 101 is experiencing a first level of freeze risk. To determine the first level of freeze risk in step 304, the controller 105 may compare the DAT received in step 302 to a first predetermined temperature threshold. If the DAT is above the first predetermined temperature threshold, the controller 105 will instruct the HVAC system 100 to continue (or resume) normal operation. After instructing the HVAC system 100 to operate according to normal operation, the controller 105 may, from time-to-time, reinitiate operation 300, starting at step 302. If the controller 105 determines in step 304 that the DAT is lower than the first predetermined threshold, the controller 105 may adjust the speed of the indoor fan 103 in step 308. For example, the controller 105 may instruct the indoor fan 103 to operate at its maximum speed to increase the rate of heat transfer between the evaporator coil 101 and the air being moved over the fan by the indoor fan 103.

In particular embodiments, in step 310 the controller 105 may determine if the evaporator coil 101 is experiencing a second level of freeze risk after increasing the speed of the indoor fan 103. To determine the second level of freeze risk in step 310, the controller 105 may compare the DAT of a new second sensor data received from the one or more sensors 104. If the DAT has not fallen below the second, even colder predetermined temperature threshold, then the controller 105 may instruct the HVAC system 100 to continue operating the indoor fan 103 at the adjusted speed but otherwise take no further action. If, however, the DAT has fallen below the second, even colder predetermined temperature threshold, then the controller 105 may instruct the HVAC system 100 to adjust the speed of the compressor 102 and associated outdoor fan speed in step 312. In step 312, the controller 105 may instruct the compressor 102 to slow its speed to reduce the volumetric flow rate of the refrigerant being cycled through the HVAC system 100 to reduce the freeze risk of the evaporator coil 102. In some embodiments, in order to reduce the system power consumption and operate more efficiently, in step 312 the controller 105 may also instruct the HVAC system 100 to decrease the speed of the condenser fan 107 and return the indoor fan 103 to a speed that is less than the maximum speed. As an example, indoor fan 103 may be operated at its normal operating speed. As another example, indoor fan 103 may be operated at a speed that is the midpoint between (a) the maximum speed of indoor fan 103 and (b) a speed that has been pre-defined for indoor fan 103 when compressor 102 is shut off.

In particular embodiments, in step 314 the controller 105 may determine whether the adjusted speed for the compressor 102 selected in step 312 falls below the minimum acceptable speed for operating the compressor 102 to ensure operational reliability of compressor 102. If the selected compressor speed from step 312 falls below the minimum acceptable speed, the controller 105 will shut off the compressor 102 in step 316 rather than operate the compressor below the minimum acceptable compressor speed. The adjustment of the compressor speed in steps 312-316 will be described in further detail in FIG. 4.

In particular embodiments, the controller 105 may, after taking a first or a second action, return the HVAC system 100 to the normal operating conditions after determining in steps 304 or 310 that the DAT has risen above both the first and the second predetermined temperature thresholds. For example, if the DAT has risen above the first and the second predetermined temperature threshold then the HVAC system 100 may resume normal operation because the evaporator coil 101 is no longer experiencing either a first or a second level of freeze risk.

The method described with respect to FIG. 3 may have more or fewer steps, and the steps may be performed in any suitable order. As an example, steps 302-308 may be performed after steps 310-316 depending on the optimal response to a given freeze risk selected by the controller 105). Although FIG. 3 has been described as using two thresholds to detect two levels of freeze risk, other embodiments could include more thresholds in order to allow for different combinations of actions to be taken to reduce the freeze risk.

Figure 4:
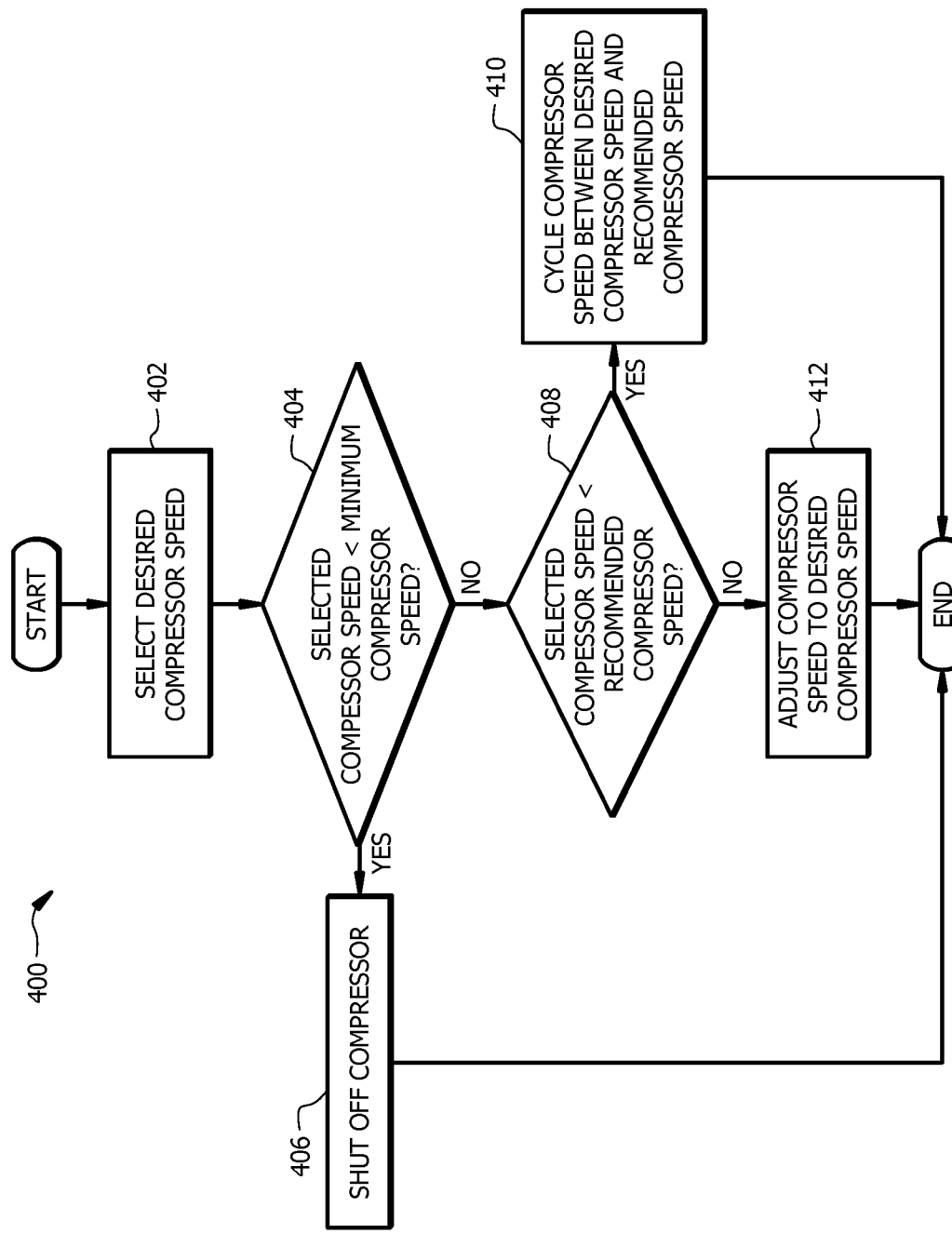
FIG. 4 is a flowchart illustrating a method that may be performed by the HVAC system to control the operation of the compressor.

FIG. 4 is a flowchart illustrating a method of operating compressor 102 of example HVAC system 100 with evaporator coil protection. It is understood that embodiments shown are simply used as examples and the invention is not restricted to these embodiments alone. In particular embodiments, controller 105 will carry out operation 400. In certain embodiments, operation 400 may be implemented when controller 105 adjusts the speed of the compressor 102 in step 312. In certain embodiments, operation 400 may be employed to ensure adequate oil circulation within compressor 102 during sustained operation of compressor 102 at a low speed. For example, when compressor 102 is operating at an adjusted speed of thirty-five percent, controller 105 may increase the speed of compressor 102 from thirty-five percent to fifty percent for a couple of minutes out of every hour. In certain embodiments, controller 105 may also reduce the speed of outdoor fan 107 as a function of the reduced compressor speed. For example, the outdoor fan 107 may be reduced in speed based on a predefined control algorithm or may be reduced in speed according to a measured head pressure of HVAC system 100 to ensure that suction and discharge pressure ratio is controlled.

In some embodiments, operation 400 may be used to determine that the compressor 102 should be shut off when the adjusted compressor speed would be less than the minimum required speed of compressor 102. For example, if the adjusted compressor speed would be less than thirty percent of the rating speed of compressor 102, the compressor 102 may be shut off instead of operating below the minimum required speed. In some embodiments, the shut off sequence may be incremental or gradual by predefined rate. Once the compressor 102 is shut off, it may not be restarted for a period of time following a sequence of operation for reliability. In some embodiments, the compressor 102 may ramp to a percentage of speed level at a predefined rate and maintain that speed level for a period of time before altering the compressor speed to the HVAC system 100 load requirement.

In some embodiments, the operation will be initiated in step 402 where the controller 105 will select a desired compressor speed based on sensor data received from the one or more sensors 104. In step 404, if the selected compressor speed falls below a minimum required speed of compressor 102 then controller 105 may command compressor 102 to shut off in step 406. Controller 105 may initiate a shut off procedure in step 406 to shut off the compressor 102 and the outdoor fan 107.

In some embodiments, if the selected compressor speed is not below the minimum required compressor speed then controller will continue with operation 400 in step 408. In step 408 controller 105 may determine if the selected compressor speed is less than a recommended reduced compressor speed. If the selected compressor speed is less than the recommended reduced compressor speed and the compressor 102 has been operating at the selected compressor speed for a first pre-defined amount of time then controller 105 may instruct compressor 102 to cycle the speed of compressor 102 in step 410 between the selected desired compressor speed and the recommended reduced compressor speed. In step 410, the controller 105 may cycle the speed of the compressor 102 between the selected speed and the recommended reduced speed for a second pre-determined amount of time and then back to the selected speed. For example, the first pre-determined amount of time may be one hour and the second pre-determined amount of time may be two minutes. If the selected compressor speed is not less than the recommended reduced compressor speed then controller 105 may instruct the compressor 102 to operate at the selected compressor speed. For example, for a system having a minimum compressor speed of thirty percent the compressor 102 rating speed and a recommended reduced compressor speed of fifty percent the rating speed, if the selected desired compressor speed in step 402 is thirty-five percent, controller 105 would instruct compressor 102 in step 410 to operate at the selected compressor speed but would cycle the speed of compressor 102 from the selected thirty-five percent up to the recommended reduced speed of fifty percent for a couple of minutes out of every hour to improve oil circulation in compressor 102. In some embodiments, the speed of outdoor fan 107 may be adjusted based on a predefined control algorithm that may reduce the speed of outdoor fan 107 according to a measured head pressure of HVAC system 100 to control the suction and discharge pressure ratio.

The method described with respect to FIG. 4 may have more or fewer steps, and the steps may be performed in any suitable order. As an example, steps 404-406 and 408-412 may be optional in certain embodiments (e.g., depending on whether the selected desired compressor speed in step 402 fell within only the range of the minimum compressor speed or only within the range of the recommended reduced compressor speed).

Modifications, additions, or omissions may be made to any of the methods disclosed herein. These methods may include more, fewer, or other steps, and steps may be performed in parallel or in any suitable order. Throughout the disclosure, the term HVAC is used in a general sense and refers to any system that circulates refrigerant in order to control the temperature of a conditioned space. Examples include heat pump systems, air conditioning systems, combined heating-and-air conditioning systems, and refrigeration systems. Similarly, the term refrigerant is used in a general sense and refers to any medium that facilitates heat transfer in an HVAC system. Examples include natural refrigerants, such as carbon dioxide, ammonia, water, air, etc., conventional refrigerants, or coolants.

While discussed as certain components of the HVAC system controller performing the steps, any suitable component or combination of components may perform one or more steps of these methods. Certain examples have been described using the modifiers "first," "second," or "third" (e.g., first sensor data, second sensor data, third sensor data; first action, second action). Unless the context in which these modifiers appear indicates otherwise, the modifiers do not require any particular sequence of steps or arrangement of devices.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system, comprising:
a controller and a plurality of heating ventilation and air conditioning (HVAC) components, the HVAC components comprising:
an evaporator unit, the evaporator unit comprising an evaporator coil and an indoor fan, the indoor fan configured to cause movement of air over the evaporator coil and through a discharge air duct positioned downstream of the evaporator coil when the indoor fan is operating; and
a condenser unit, the condenser unit comprising a compressor, a condenser coil, and an outdoor fan, the compressor configured to drive refrigerant through the HVAC components, the outdoor fan configured to cause movement of air over the condenser coil when the outdoor fan is operating;
the controller configured to:
receive first sensor data from one or more sensors, each sensor configured to sense a property associated with the HVAC components;
determine, based on the first sensor data, that the evaporator coil is experiencing a first level of freeze risk;
in response to determining that the evaporator coil is experiencing the first level of freeze risk, send the HVAC components an instruction to perform a first action, wherein the first action comprises increasing the speed of the indoor fan to a maximum speed;
receive second sensor data from the one or more sensors;
determine, based on the second sensor data, that the evaporator coil is experiencing a second level of freeze risk, the second level indicating a greater risk of freezing than the first level; and
in response to determining that the evaporator coil is experiencing a second level of freeze risk, send the HVAC components an instruction to perform a second action, wherein the second action comprises decreasing the speed of the indoor fan.

2. The system of claim 1, wherein:
the first sensor data comprises a first temperature sensed by a discharge air temperature sensor configured to sense air temperature in the discharge air duct, and wherein the controller is configured to determine that the evaporator coil is experiencing the first level of freeze risk when the first temperature is below a first threshold; and
the second sensor data comprises a second temperature sensed by the discharge air temperature sensor, and wherein the controller is configured to determine that the evaporator coil is experiencing the second level of freeze risk when the second temperature is below a second threshold that is less than the first threshold.

3. The system of claim 1, wherein the first action comprises increasing the speed of the indoor fan.

4. The system of claim 1, wherein the second action comprises reducing the speed of the compressor and reducing the speed of the outdoor fan.

5. The system of claim 4, wherein the controller is further configured to:
determine, on a periodic basis, whether the compressor has been operating at the reduced speed below a recommended reduced speed for a first pre-determined amount of time;
in response to determining that the compressor has been operating at the reduced speed below the recommended reduced speed for the first pre-determined amount of time, send the HVAC components an instruction to increase the compressor speed for a second pre-determined amount of time; and
in response to determining that the second pre-determined amount of time has elapsed, send the HVAC components an instruction to resume operating the compressor at the reduced speed.

6. The system of claim 1, wherein the second action comprises:
determining whether reducing the compressor speed to a setting configured to mitigate the second level of freeze risk would cause the compressor to operate below a minimum compressor speed; and
in response to determining that reducing the compressor speed would cause the compressor to operate below the minimum compressor speed, initiating a procedure to shut off the compressor and the outdoor fan.

7. The system of claim 1, wherein the controller is further configured to:
receive third sensor data from the one or more sensors;
determine, based on the third sensor data, that the evaporator coil has recovered from the first level of freeze risk and the second level of freeze risk; and
in response to the determination that the evaporator coil has recovered from the first level of freeze risk and the second level of freeze risk, send the HVAC components one or more instructions that cause the HVAC components to resume normal operation.

8. The system of claim 1, wherein the one or more sensors sense properties other than a coil temperature of the evaporator coil.

9. A controller for an HVAC system, the controller configured to:
receive first sensor data from one or more sensors, each sensor configured to sense a property associated with the HVAC system;
determine, based on the first sensor data, that an evaporator coil is experiencing a first level of freeze risk;
in response to determining that the evaporator coil is experiencing the first level of freeze risk, send the HVAC system an instruction to perform a first action, wherein the first action comprises increasing the speed of an indoor fan to a maximum speed;

receive second sensor data from the one or more sensors;
determine, based on the second sensor data, that the evaporator coil is experiencing a second level of freeze risk, the second level indicating a greater risk of freezing than the first level; and
in response to determining that the evaporator coil is experiencing a second level of freeze risk, send the HVAC system an instruction to perform a second action, wherein the second action comprises decreasing the speed of the indoor fan.

10. The controller of claim 9, wherein:
the first sensor data comprises a first temperature sensed by a discharge air temperature sensor configured to sense air temperature in a discharge air duct, and wherein the controller is configured to determine that the evaporator coil is experiencing the first level of freeze risk when the first temperature is below a first threshold; and
the second sensor data comprises a second temperature sensed by the discharge air temperature sensor, and wherein the controller is configured to determine that the evaporator coil is experiencing the second level of freeze risk when the second temperature is below a second threshold that is less than the first threshold.

11. The controller of claim 9, wherein:
the first action comprises increasing the speed of an indoor fan and the second action comprises reducing the speed of a compressor and reducing the speed of an outdoor fan.

12. The controller of claim 9, wherein the second action comprises operating the compressor at a reduced speed and wherein the controller is further configured to:
determine, on a periodic basis, whether the compressor has been operating at the reduced speed below a recommended reduced speed for a first pre-determined amount of time;
in response to determining that the compressor has been operating at the reduced speed below the recommended reduced speed for the first pre-determined amount of time, send the HVAC system an instruction to increase the compressor speed for a second pre-determined amount of time; and
in response to determining that the second pre-determined amount of time has elapsed, send the HVAC system an instruction to resume operating the compressor at the reduced speed.

13. The controller of claim 9, wherein the controller is further configured to:
receive third sensor data from the one or more sensors;
determine, based on the third sensor data, that the evaporator coil has recovered from the first level of freeze risk and the second level of freeze risk; and
in response to the determination that the evaporator coil has recovered from the first level of freeze risk and the second level of freeze risk, send the HVAC system one or more instructions that cause the HVAC system to resume normal operation.

14. A method, comprising:
receiving first sensor data from one or more sensors, each sensor configured to sense a property associated with HVAC components;
determining, based on the first sensor data, that an evaporator coil is experiencing a first level of freeze risk;
in response to determining that the evaporator coil is experiencing the first level of freeze risk, sending the HVAC components an instruction to perform a first action, wherein the first action comprises increasing the speed of an indoor fan to a maximum speed;
receiving second sensor data from the one or more sensors;
determining, based on the second sensor data, that the evaporator coil is experiencing a second level of freeze risk, the second level indicating a greater risk of freezing than the first level; and
in response to determining that the evaporator coil is experiencing a second level of freeze risk, sending the HVAC components an instruction to perform a second action, wherein the second action comprises reducing the speed of a compressor, reducing the speed of an outdoor fan, and reducing the speed of the indoor fan.

15. The method of claim 14, wherein:
the first sensor data comprises a first temperature sensed by a discharge air temperature sensor configured to sense air temperature in a discharge air duct, and the method further comprising determining that the evaporator coil is experiencing the first level of freeze risk when the first temperature is below a first threshold; and
the second sensor data comprises a second temperature sensed by the discharge air temperature sensor, and the method further comprising that the evaporator coil is experiencing the second level of freeze risk when the second temperature is below a second threshold that is less than the first threshold.

16. The method of claim 14, wherein the second action comprises operating the compressor at a reduced speed and further comprising:
determining, on a periodic basis, whether the compressor has been operating at the reduced speed below a recommended reduced speed for a first pre-determined amount of time;
in response to determining that the compressor has been operating at the reduced speed below the recommended reduced speed for the first pre-determined amount of time, sending the HVAC components an instruction to increase the compressor speed for a second pre-determined amount of time; and
in response to determining that the second pre-determined amount of time has elapsed, sending the HVAC components an instruction to resume operating the compressor at the reduced speed.

17. A system, comprising:
a controller and a plurality of heating ventilation and air conditioning (HVAC) components, the HVAC components comprising:
an evaporator unit, the evaporator unit comprising an evaporator coil and an indoor fan, the indoor fan configured to cause movement of air over the evaporator coil and through a discharge air duct positioned downstream of the evaporator coil when the indoor fan is operating; and
a condenser unit, the condenser unit comprising a compressor, a condenser coil, and an outdoor fan, the compressor configured to drive refrigerant through the HVAC components, the outdoor fan configured to cause movement of air over the condenser coil when the outdoor fan is operating;
the controller configured to:
receive first sensor data from one or more sensors, each sensor configured to sense a property associated with the HVAC components;

determine, based on the first sensor data, that the
evaporator coil is experiencing a first level of freeze
risk;
in response to determining that the evaporator coil is
experiencing the first level of freeze risk, send the
HVAC components an instruction to perform a first
action;
receive second sensor data from the one or more
sensors;
determine, based on the second sensor data, that the
evaporator coil is experiencing a second level of
freeze risk, the second level indicating a greater risk
of freezing than the first level;
in response to determining that the evaporator coil is
experiencing a second level of freeze risk, send the
HVAC components an instruction to perform a second action;
determine, on a periodic basis, whether the compressor
has been operating at the reduced speed below a
recommended reduced speed for a first pre-determined amount of time;
in response to determining that the compressor has
been operating at the reduced speed below the recommended reduced speed for the first pre-determined amount of time, send the HVAC components
an instruction to increase the compressor speed for a
second pre-determined amount of time; and
in response to determining that the second pre-determined amount of time has elapsed, send the HVAC
components an instruction to resume operating the
compressor at the reduced speed.

18. A system, comprising:
a controller and a plurality of heating ventilation and air
conditioning (HVAC) components, the HVAC components comprising:
an evaporator unit, the evaporator unit comprising an
evaporator coil and an indoor fan, the indoor fan
configured to cause movement of air over the evaporator coil and through a discharge air duct positioned
downstream of the evaporator coil when the indoor
fan is operating; and
a condenser unit, the condenser unit comprising a
compressor, a condenser coil, and an outdoor fan, the
compressor configured to drive refrigerant through
the HVAC components, the outdoor fan configured
to cause movement of air over the condenser coil
when the outdoor fan is operating;
the controller configured to:
receive first sensor data from one or more sensors, each
sensor configured to sense a property associated with
the HVAC components;
determine, based on the first sensor data, that the
evaporator coil is experiencing a first level of freeze
risk;
in response to determining that the evaporator coil is
experiencing the first level of freeze risk, send the
HVAC components an instruction to perform a first
action;
receive second sensor data from the one or more
sensors;
determine, based on the second sensor data, that the
evaporator coil is experiencing a second level of
freeze risk, the second level indicating a greater risk
of freezing than the first level; and in response to determining that the evaporator coil is
experiencing a second level of freeze risk, send the
HVAC components an instruction to perform a second action;
wherein the second action comprises:
determining whether reducing the compressor speed
to a setting configured to mitigate the second level
of freeze risk would cause the compressor to
operate below a minimum compressor speed; and
in response to determining that reducing the compressor speed would cause the compressor to
operate below the minimum compressor speed,
initiating a procedure to shut off the compressor
and the outdoor fan.

19. A controller for an HVAC system, the controller
configured to:
receive first sensor data from one or more sensors, each
sensor configured to sense a property associated with
the HVAC system;
determine, based on the first sensor data, that an evaporator coil is experiencing a first level of freeze risk;
in response to determining that the evaporator coil is
experiencing the first level of freeze risk, send the
HVAC system an instruction to perform a first action;
receive second sensor data from the one or more sensors;
determine, based on the second sensor data, that the
evaporator coil is experiencing a second level of freeze
risk, the second level indicating a greater risk of
freezing than the first level; and
in response to determining that the evaporator coil is
experiencing a second level of freeze risk, send the
HVAC system an instruction to perform a second
action, wherein the second action comprises operating
the compressor at a reduced speed;
wherein the controller is further configured to:
determine, on a periodic basis, whether the compressor
has been operating at the reduced speed below a
recommended reduced speed for a first pre-determined amount of time;
in response to determining that the compressor has
been operating at the reduced speed below the recommended reduced speed for the first pre-determined amount of time, send the HVAC system an
instruction to increase the compressor speed for a
second pre-determined amount of time; and
in response to determining that the second pre-determined amount of time has elapsed, send the HVAC
system an instruction to resume operating the compressor at the reduced speed.

20. A method, comprising:
receiving first sensor data from one or more sensors, each
sensor configured to sense a property associated with
HVAC components;
determining, based on the first sensor data, that an evaporator coil is experiencing a first level of freeze risk;
in response to determining that the evaporator coil is
experiencing the first level of freeze risk, sending the
HVAC components an instruction to perform a first
action;
receiving second sensor data from the one or more
sensors;
determining, based on the second sensor data, that the
evaporator coil is experiencing a second level of freeze
risk, the second level indicating a greater risk of
freezing than the first level; and
in response to determining that the evaporator coil is
experiencing a second level of freeze risk, sending the HVAC components an instruction to perform a second action, wherein the second action comprises operating the compressor at a reduced speed;

determining, on a periodic basis, whether the compressor has been operating at the reduced speed below a recommended reduced speed for a first pre-determined amount of time;

in response to determining that the compressor has been operating at the reduced speed below the recommended reduced speed for the first pre-determined amount of time, sending the HVAC components an instruction to increase the compressor speed for a second pre-determined amount of time; and in response to determining that the second pre-determined amount of time has elapsed, sending the HVAC components an instruction to resume operating the compressor at the reduced speed.

* * * * *